United States Patent
Lawrence et al.

(10) Patent No.: US 7,749,946 B2
(45) Date of Patent: Jul. 6, 2010

(54) CROSSLINKING COMPOSITION FOR FRACTURING FLUIDS

(75) Inventors: Sally Lawrence, Calgary (CA); Neil Warrender, Calgary (CA)

(73) Assignee: Sanjel Corporation, Calgary, Alberta (CA)

( * ) Notice: Subject to any disclaimer, the term of this patent is extended or adjusted under 35 U.S.C. 154(b) by 373 days.

(21) Appl. No.: 11/841,401

(22) Filed: Aug. 20, 2007

(65) Prior Publication Data

US 2009/0054273 A1    Feb. 26, 2009

(51) Int. Cl.
  *C09K 8/60* (2006.01)
  *C09K 8/64* (2006.01)
  *C09K 8/528* (2006.01)
  *C23F 11/18* (2006.01)

(52) U.S. Cl. .................... 507/240; 507/265; 507/238; 507/237; 507/271

(58) Field of Classification Search .............. 507/240, 507/265, 238, 237, 271
See application file for complete search history.

(56) References Cited

U.S. PATENT DOCUMENTS

| 3,505,374 | A | | 4/1970 | Monroe |
| 5,571,315 | A | | 11/1996 | Smith et al. |
| 5,647,900 | A | | 7/1997 | Smith et al. |
| 5,693,837 | A | | 12/1997 | Smith et al. |
| 6,004,908 | A | * | 12/1999 | Graham et al. ............. 507/238 |
| 6,054,417 | A | | 4/2000 | Graham et al. |
| 6,271,409 | B1 | | 8/2001 | Geib |
| 6,297,201 | B1 | | 10/2001 | Geib |
| 6,387,137 | B1 | | 5/2002 | Geib |
| 2001/0056044 | A1 | * | 12/2001 | Kinker et al. ............. 508/469 |
| 2007/0197402 | A1 | * | 8/2007 | O'neil et al. ............. 507/238 |

FOREIGN PATENT DOCUMENTS

WO    9727266    7/1997

* cited by examiner

*Primary Examiner*—Timothy J. Kugel
*Assistant Examiner*—Atnaf Admasu
(74) *Attorney, Agent, or Firm*—Bennett Jones LLP

(57) ABSTRACT

Improved gelled hydrocarbon fracturing fluids include a gelling agent and a crosslinking composition including a crosslinking agent and a catalytic agent. The catalytic agent is a fatty quaternized amine, which includes monoalkyl benzyl quaternized amines.

20 Claims, 15 Drawing Sheets

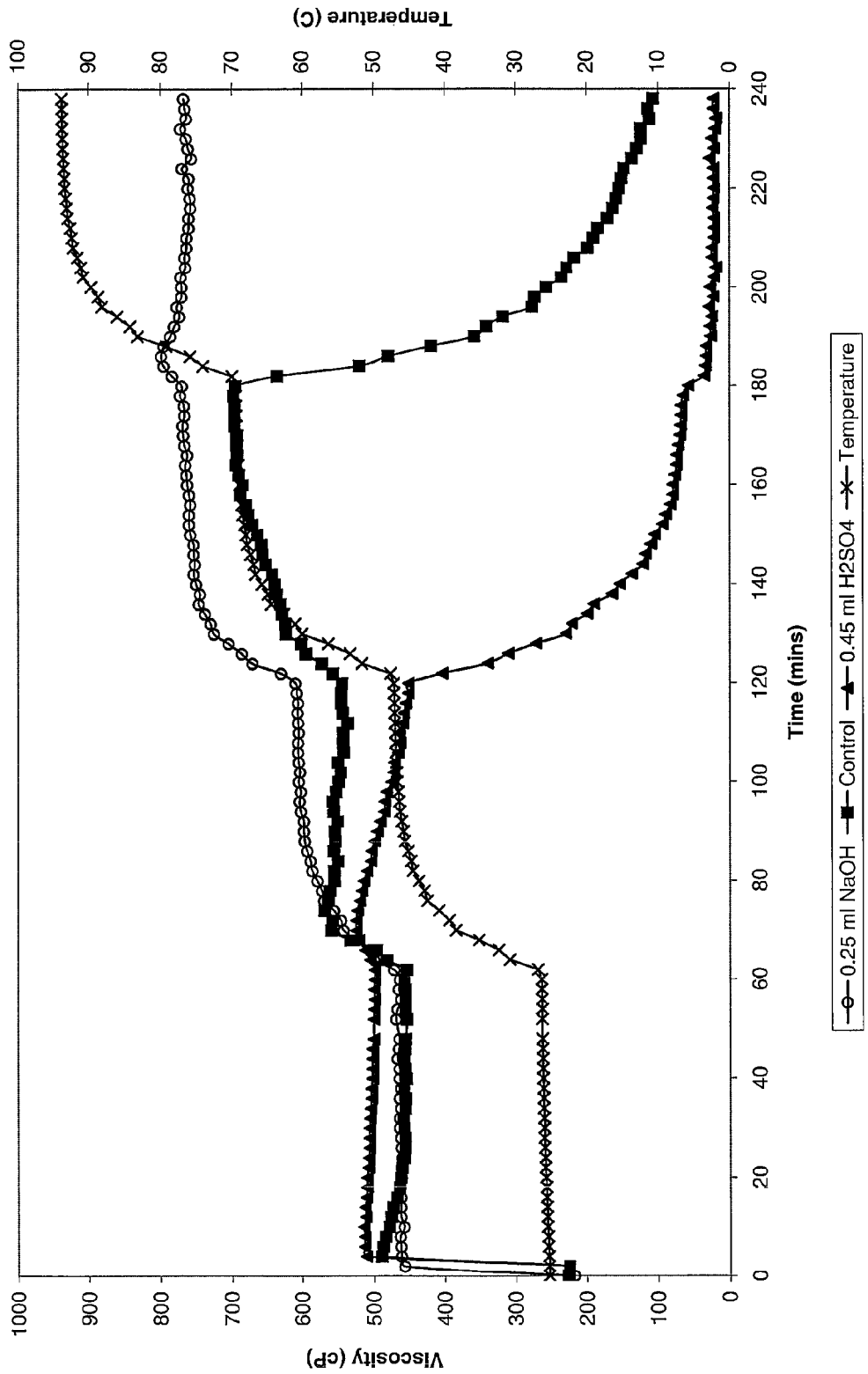
Figure 1 Effect of pH on Viscosity of Iron Oil Gel

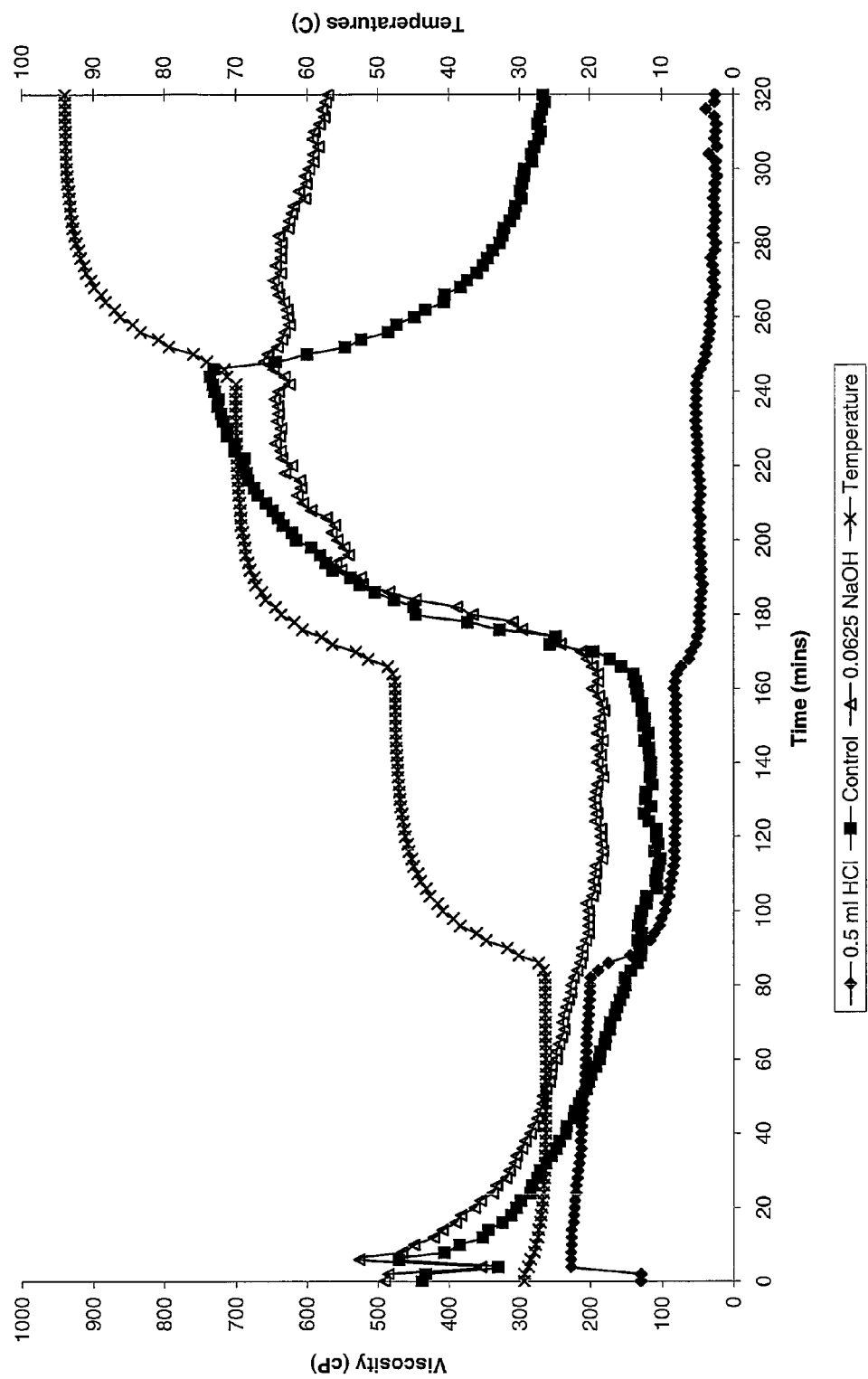

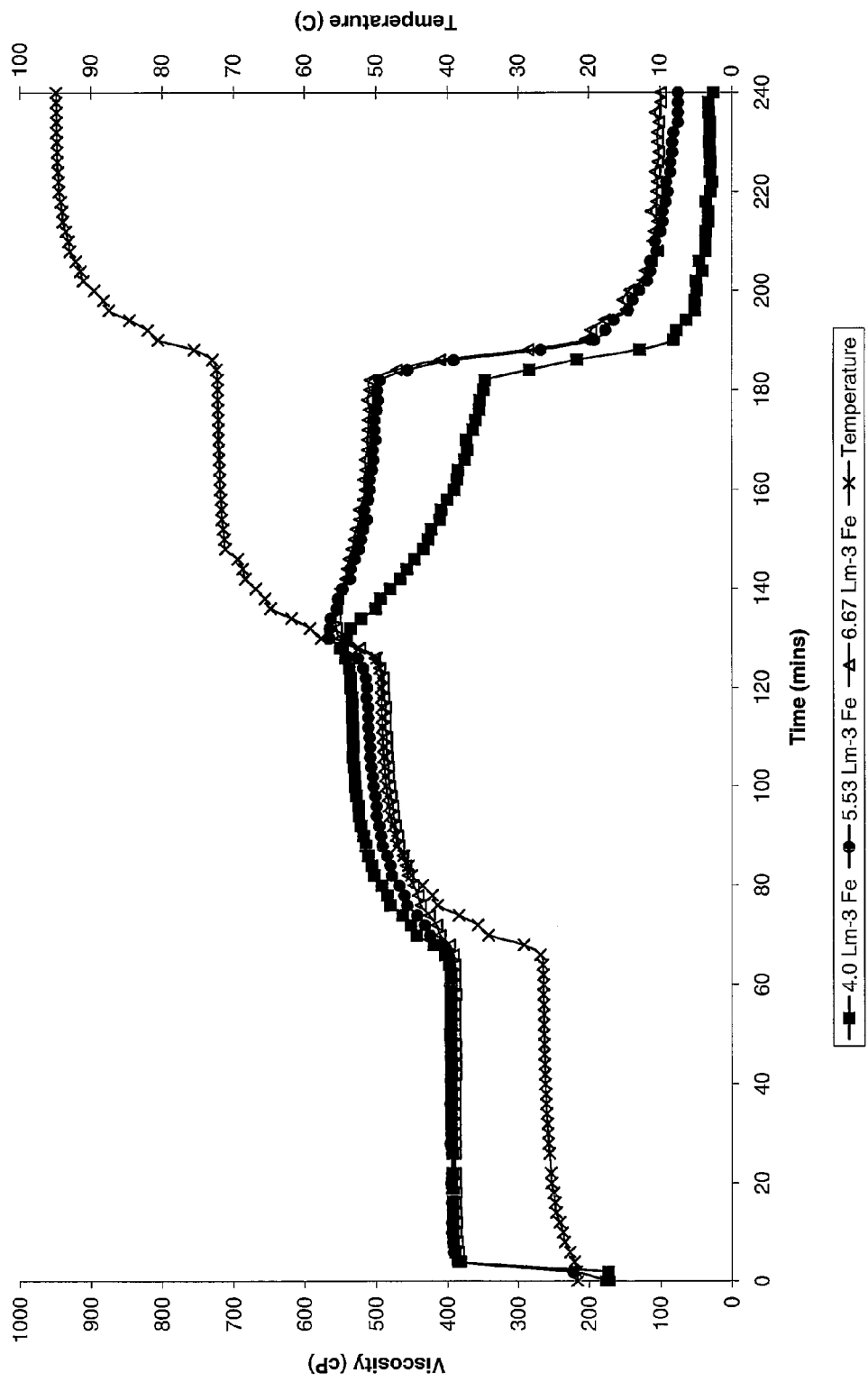

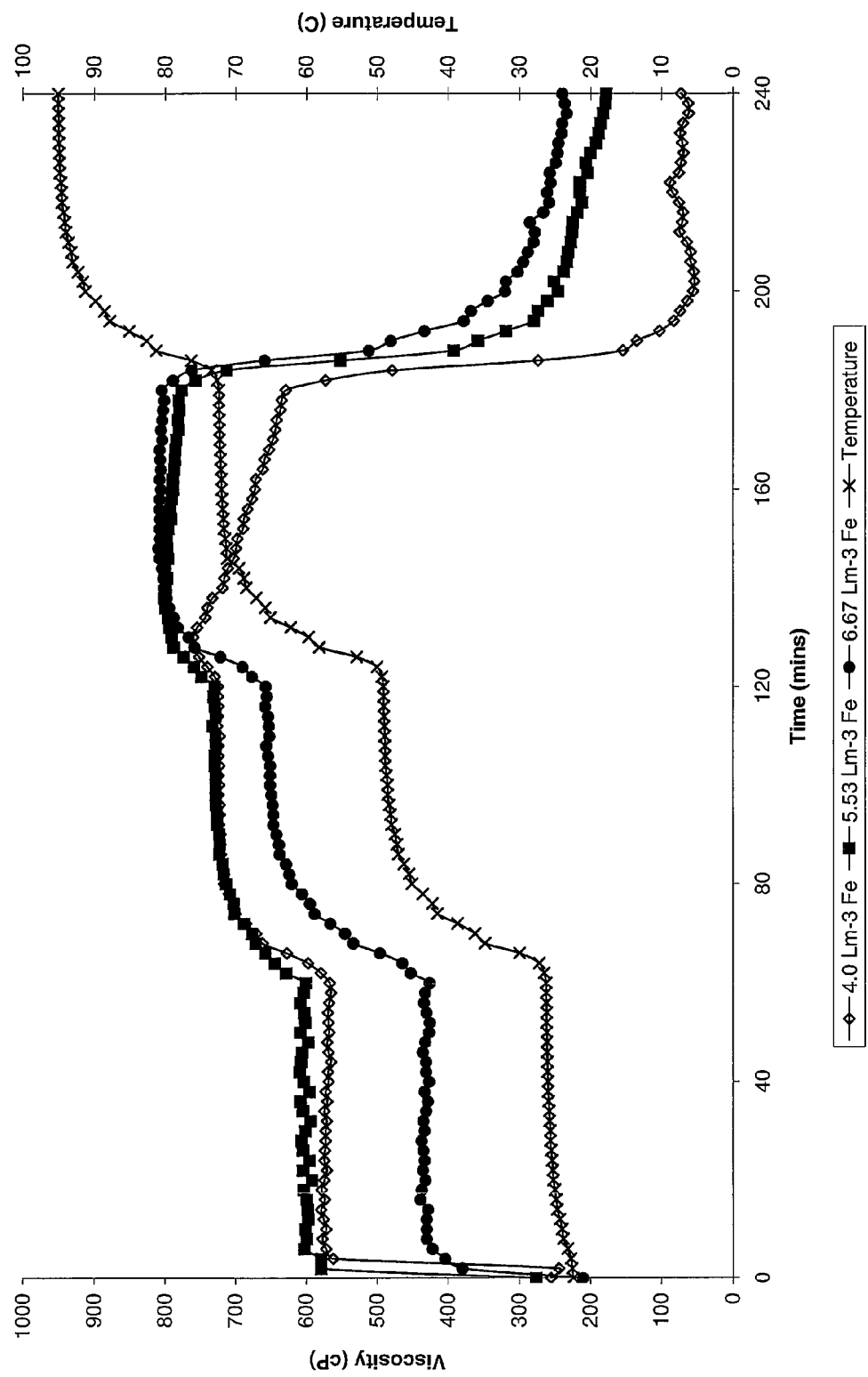

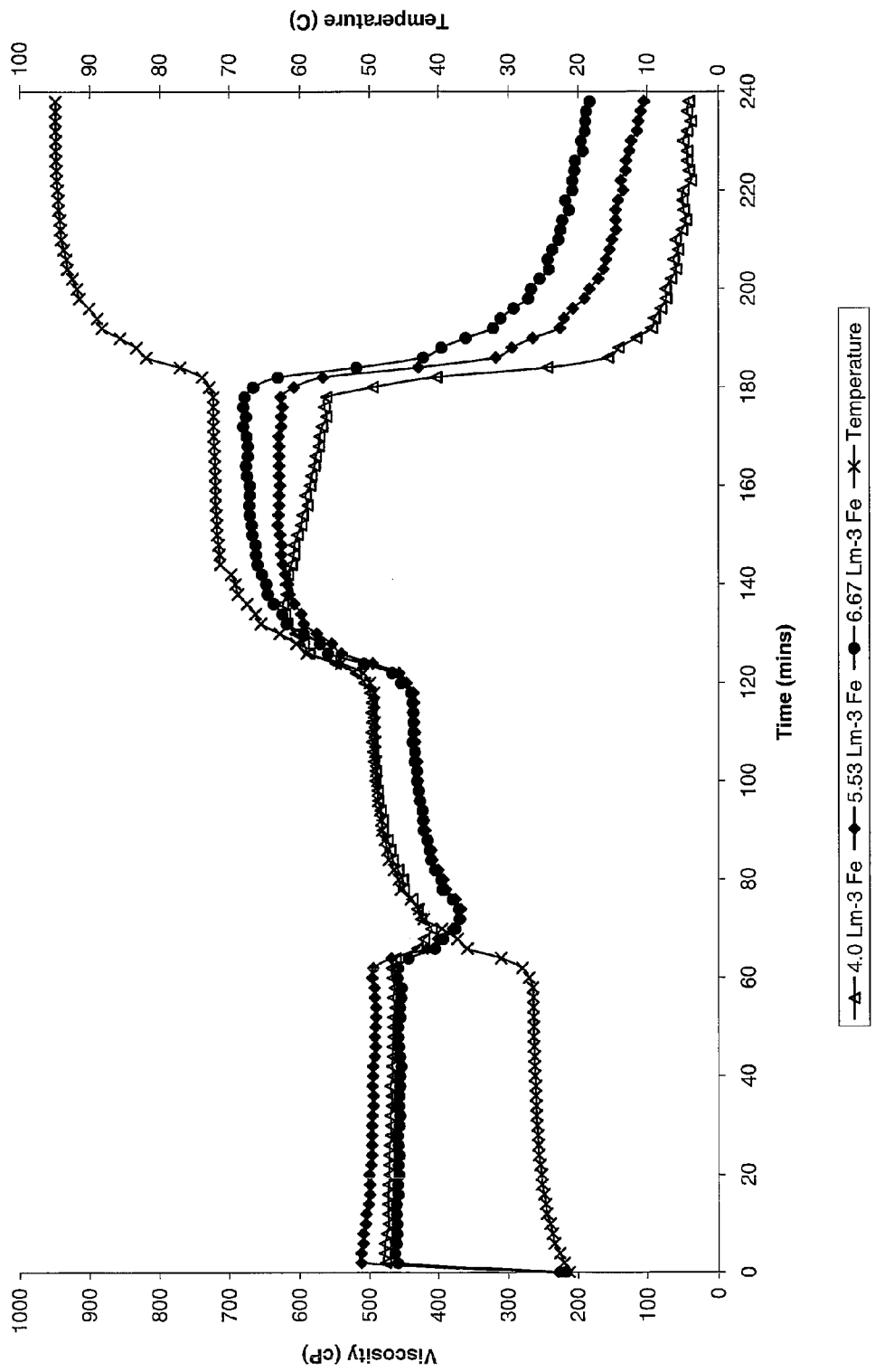

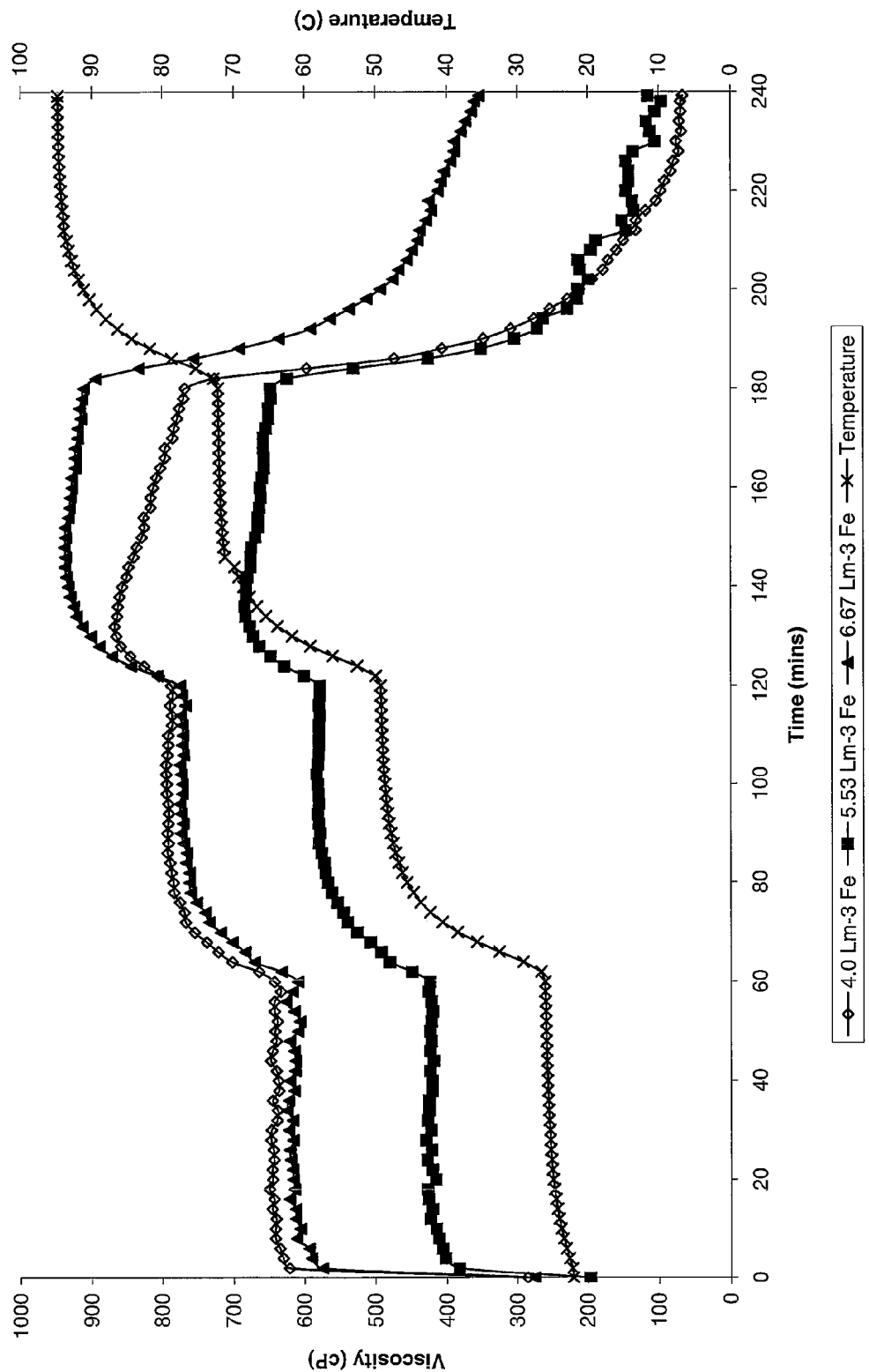

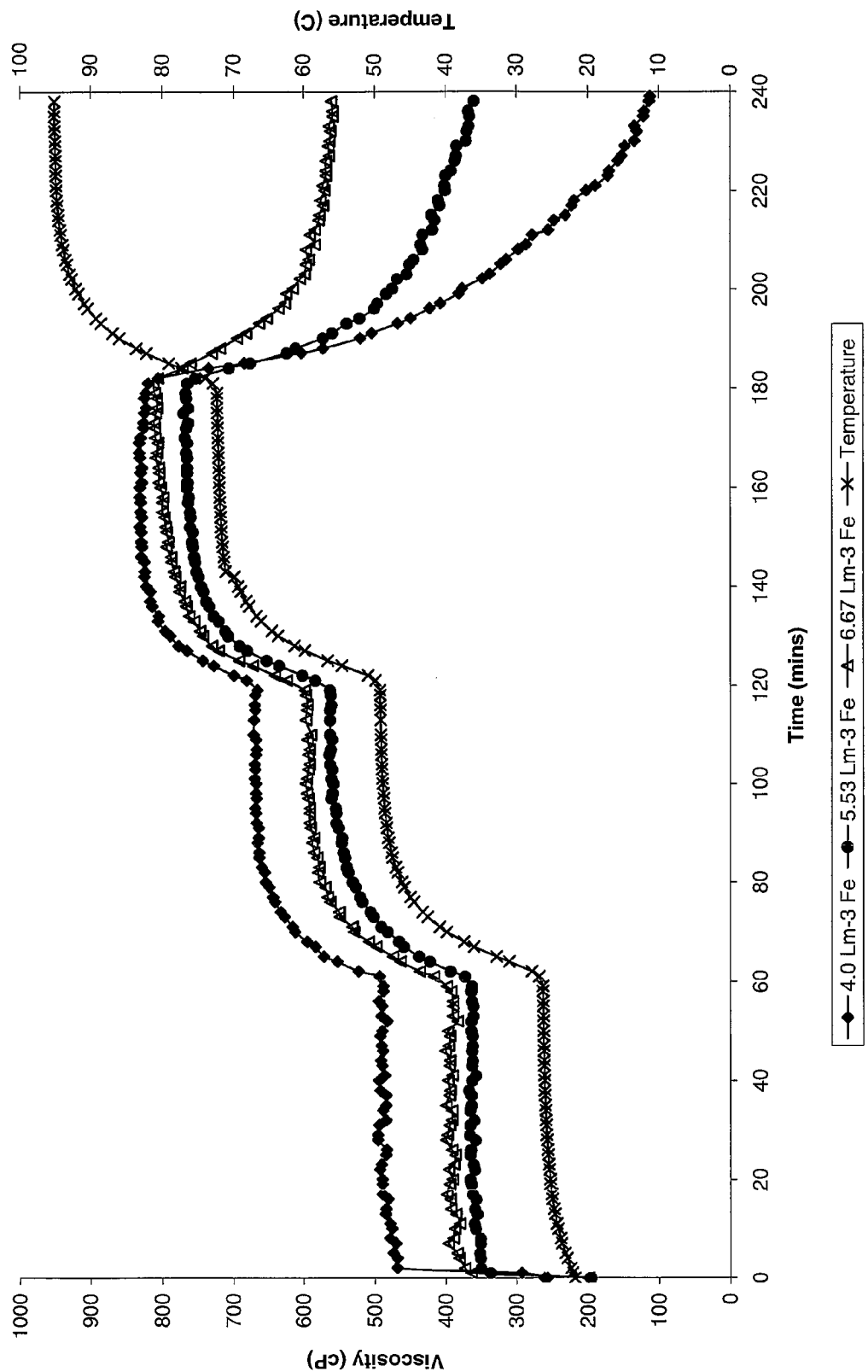

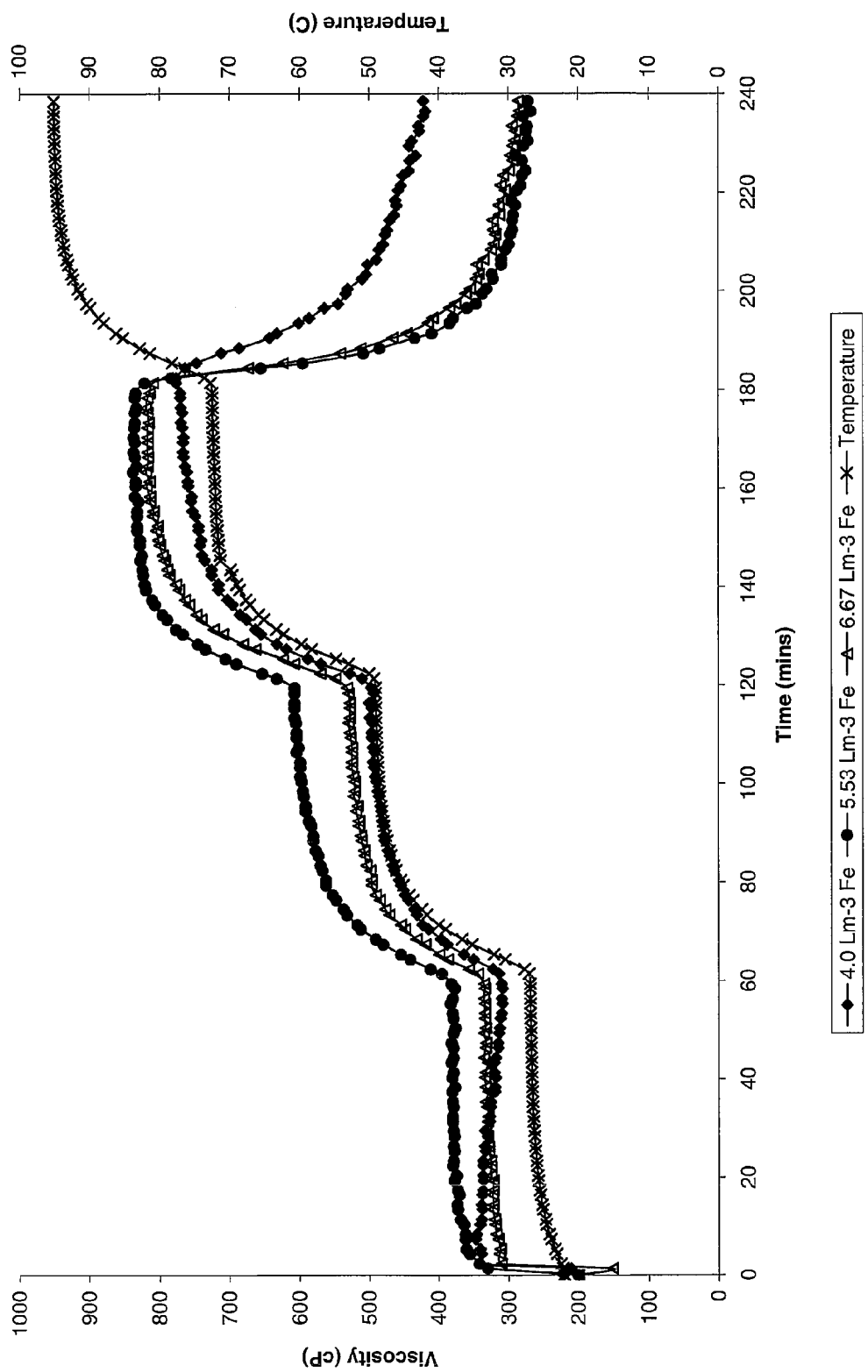

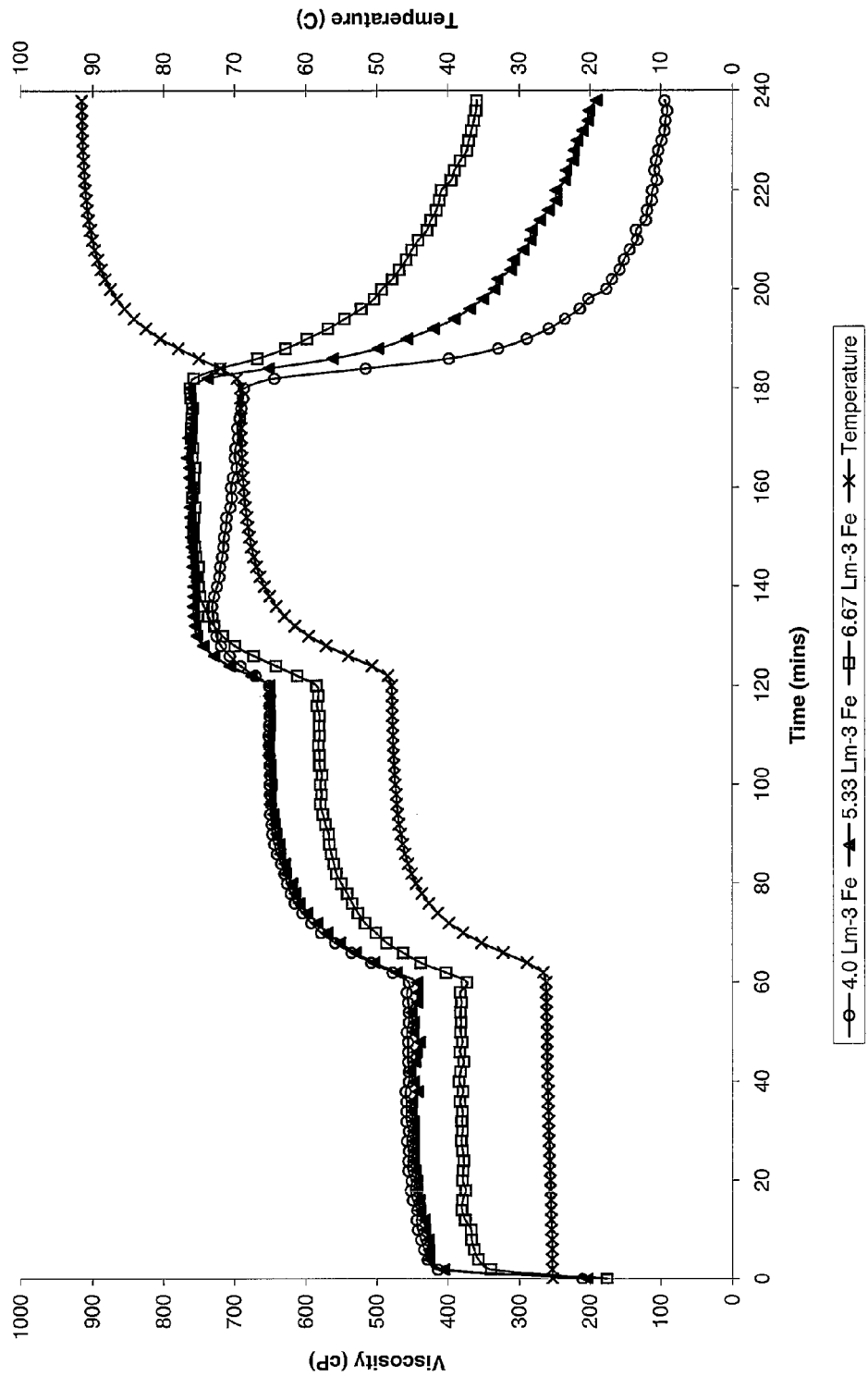

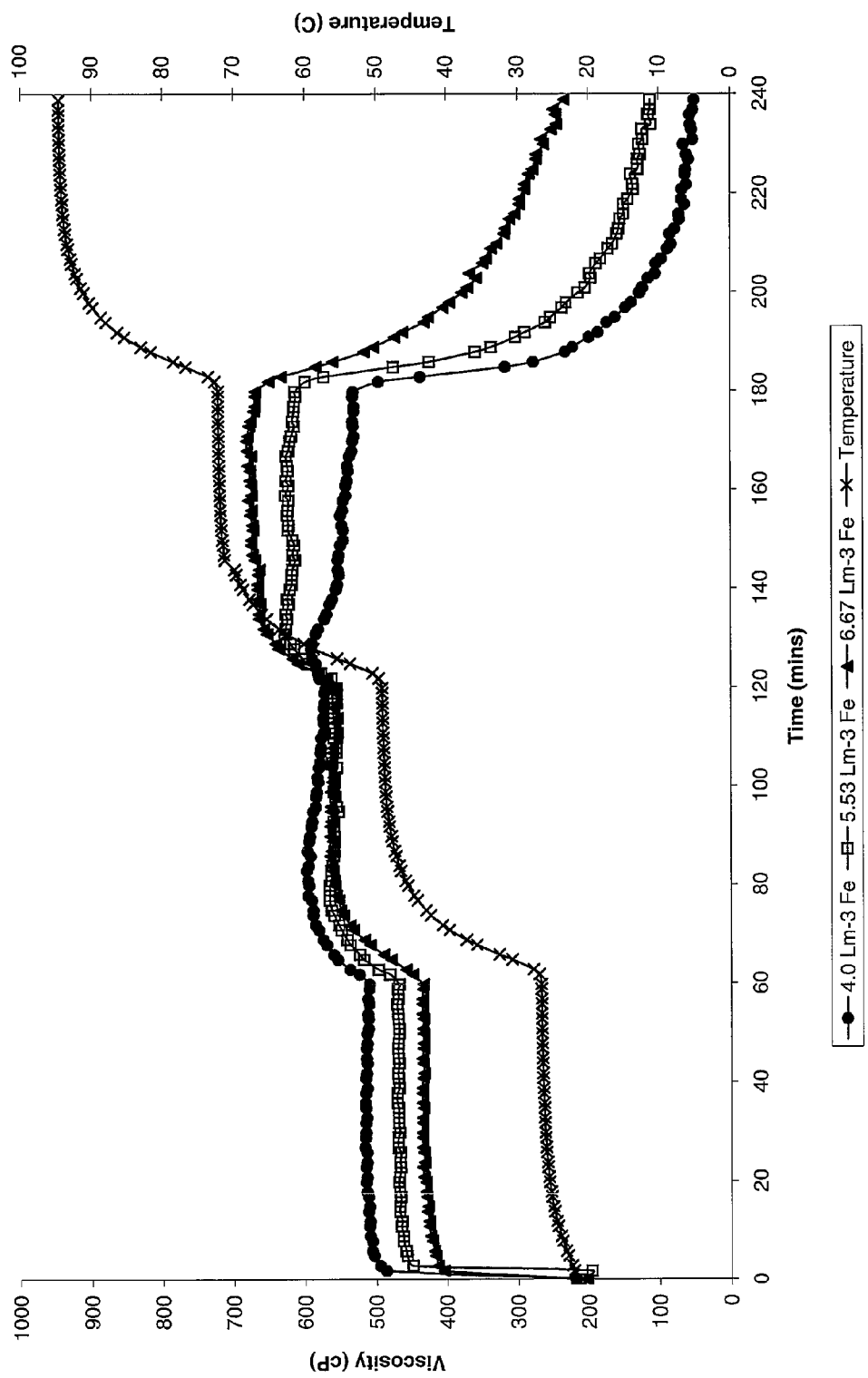

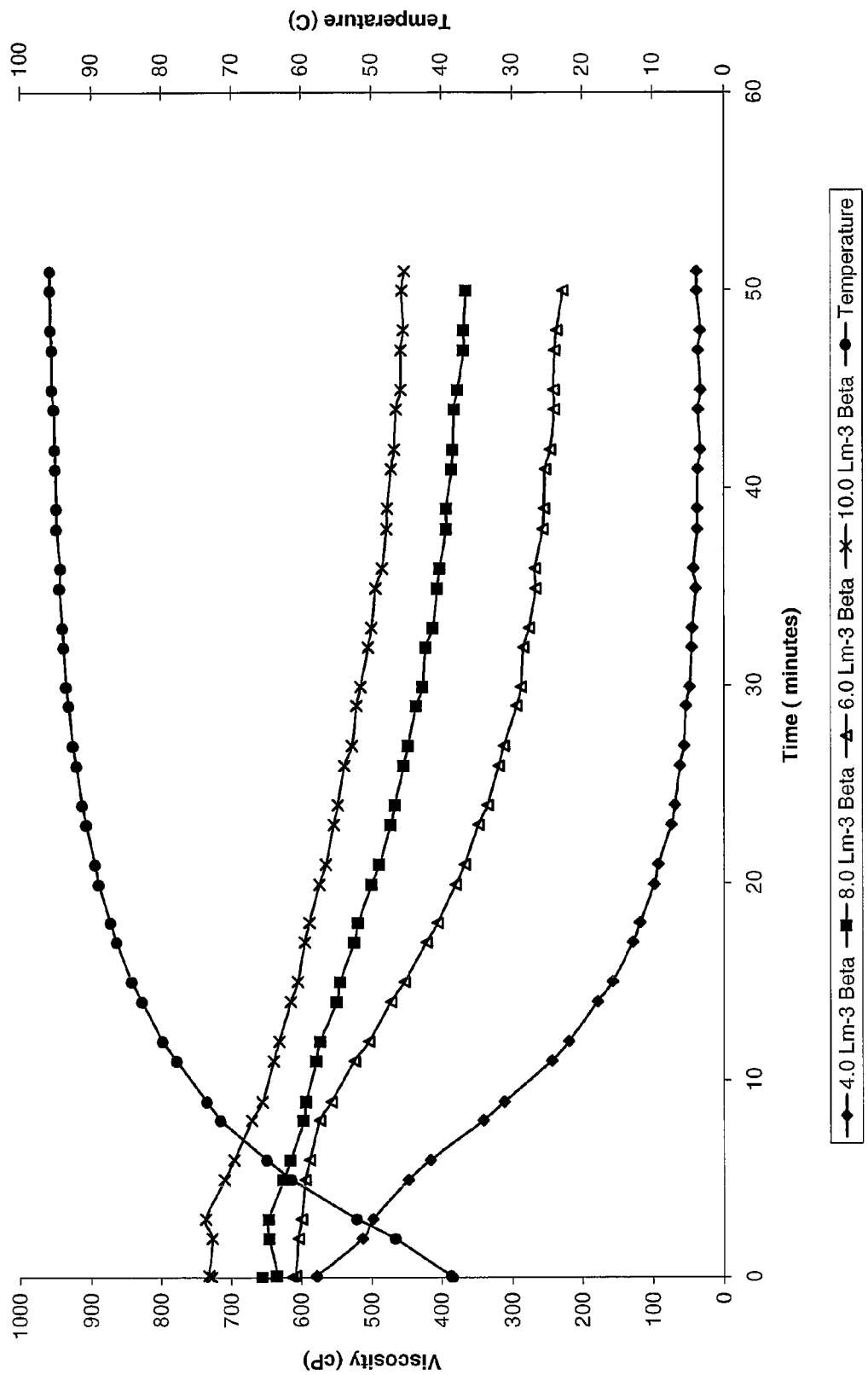

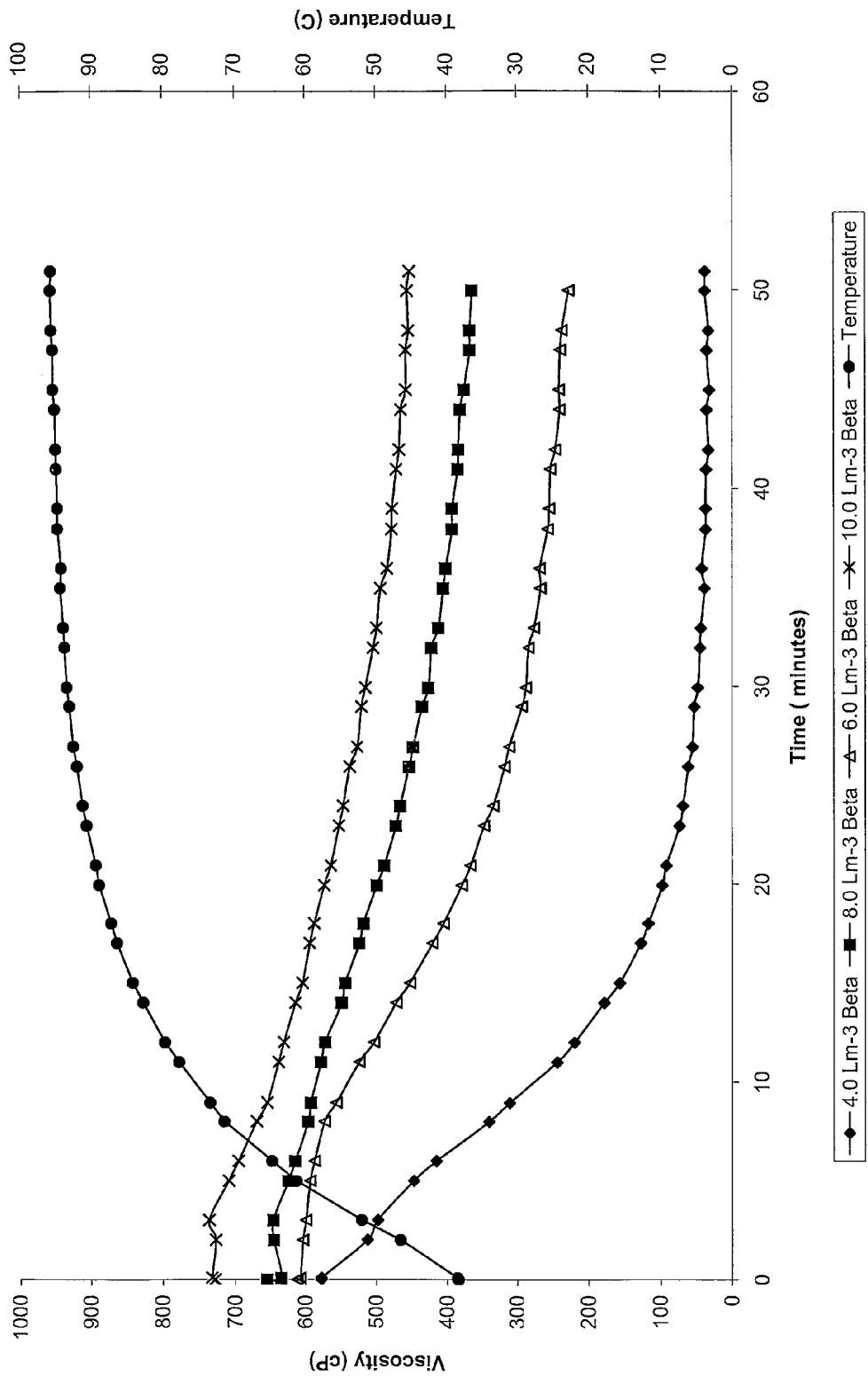

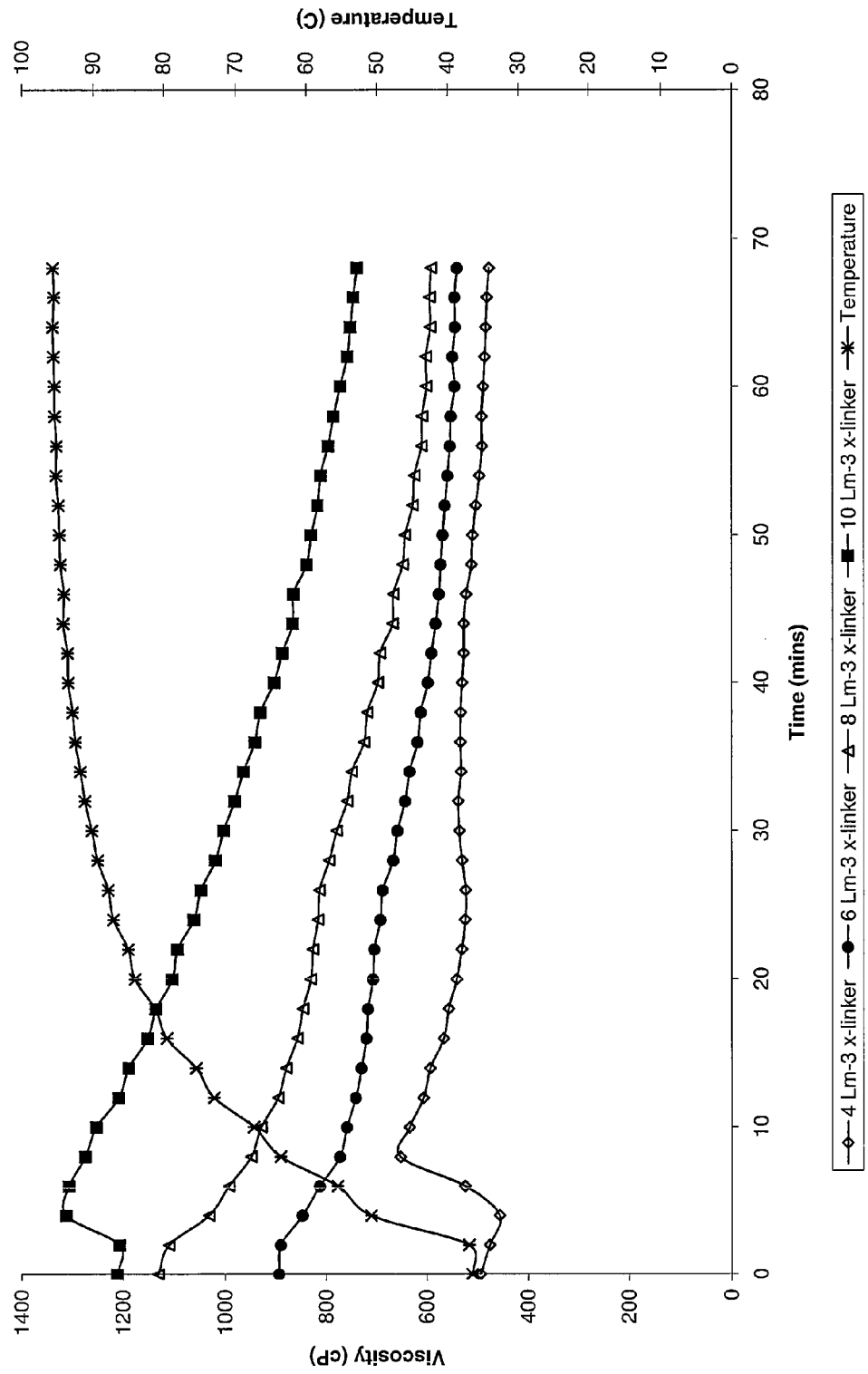
Figure 13 Viscosity of Oil Gel Containing 0.5 Lm-3 MEA Varying Beta Crosslinker Loading

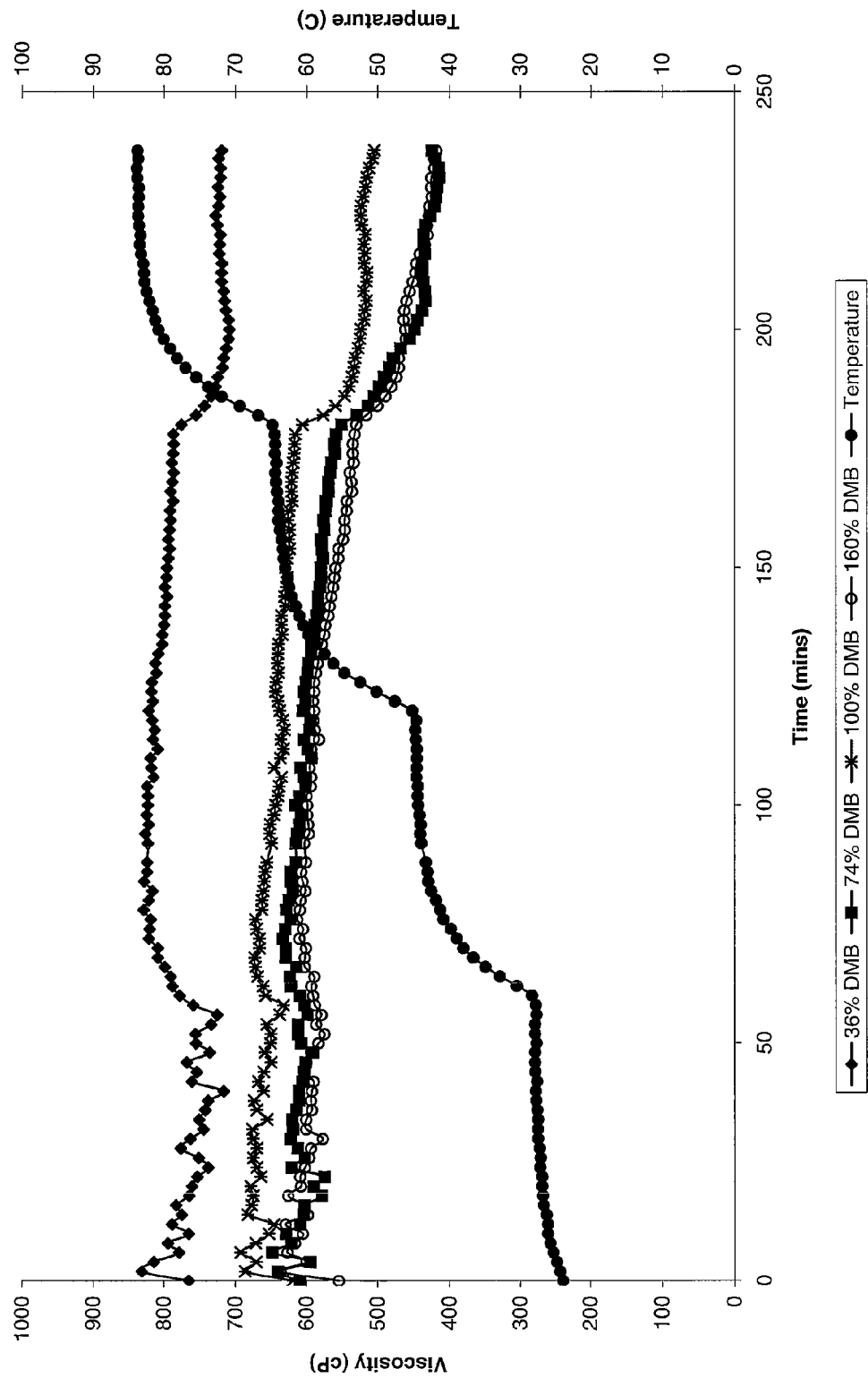
Figure 14 Optimisation of DMB Content

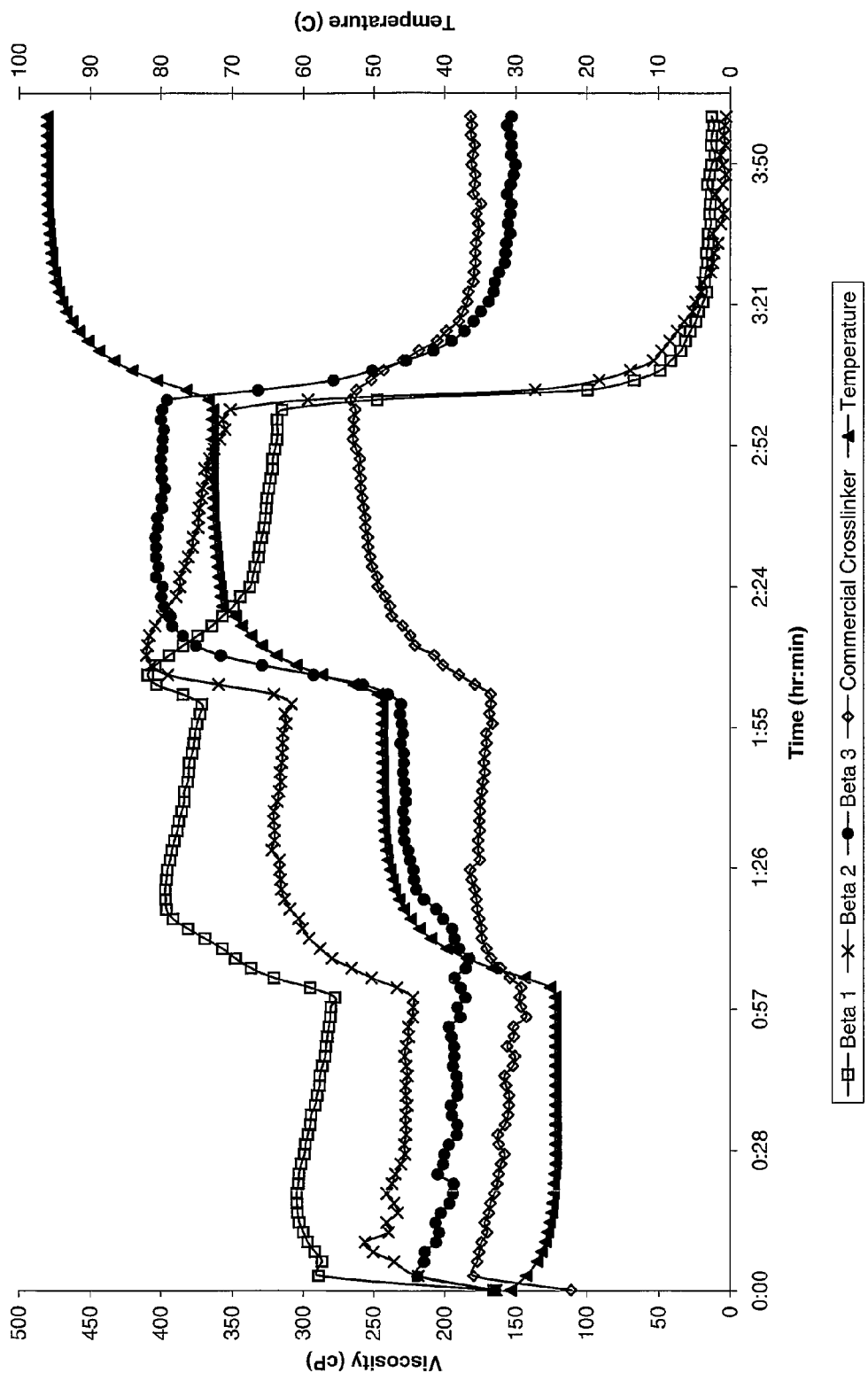

CROSSLINKING COMPOSITION FOR FRACTURING FLUIDS

FIELD OF THE INVENTION

The present invention relates to gelled hydrocarbon fracturing fluids.

BACKGROUND

The basic technique of formation fracturing involves the injection of a fracturing fluid down the well bore to create and perpetuate fractures in the underground formation. The fracturing fluid is under high pressure, and must be able to survive the shear forces caused when flow is forced through casing perforations, other restrictions, and at the leading edge of the fracture.

Hydrocarbon gels are commonly used as fracturing fluids especially in cases where the formation is extremely water sensitive. The fluid viscosity is increased using phosphate esters such as mixed ethyl, octyl and decyl mono-, di- and triesters combined with metals, specifically ferric ions and aluminum ions. The metals are referred to as crosslinking agents.

Ferric salts used in the gelling of a hydrocarbon system for formation fracturing are described in U.S. Pat. No. 5,571,315, the contents of which are incorporated herein by reference. The use of amines and polycarboxylic acids to assist the gelling process are described in U.S. Pat. No. 5,647,900, the contents of which are incorporated herein by reference. Enhancers for use in the gelling of hydrocarbon liquids are known and described in U.S. Pat. Nos. 6,297,201 and 6,387,137, the contents of which are incorporated herein by reference.

Most formation fracturing involves onsite mixing of the fluid with short residence time in the surface mixing equipment. As a result, it is advantageous for gel formation to occur quickly upon mixing of the gelling agent and the crosslinker. Commercially available aluminum and iron solutions will form gels with phosphate esters in hydrocarbon liquids. It would be advantageous if such viscosity gain occurred quickly, allowing faster "mix on the fly" applications.

In addition, hydrocarbon gels are temperature sensitive, and the upper limit of stability can be under 100° C. There are many situations where enhanced temperature stability would be desirable.

SUMMARY OF THE INVENTION

In one aspect, the invention comprises a composition for gelling a hydrocarbon fracturing fluid, comprising:
 (a) a gelling agent comprising a phosphate ester;
 (b) a crosslinking agent comprising a multivalent metal ion; and
 (c) a catalytic agent comprising a fatty quaternized amine.

In one embodiment, the composition may further comprise a base, such as NaOH or a primary amino alcohol. The primary amino alcohol may comprise monoethanolamine.

In one embodiment, the composition may further comprise a coupling agent, such as ethylene glycol or a primary amino alcohol. The primary amino alcohol may comprise monoethanolamine.

In another aspect, the invention may comprise a method of forming a gelled hydrocarbon fracturing fluid, comprising the step of mixing together a base hydrocarbon fluid, a gelling agent comprising a phosphate ester, a crosslinking agent comprising a multivalent metal ion; and a catalytic agent comprising a fatty quaternized amine.

In another aspect, the invention may comprise a method of improving the temperature stability of a gelled hydrocarbon fracturing fluid, comprising the step of mixing together a base hydrocarbon fluid, a gelling agent comprising a phosphate ester, a crosslinking agent comprising a multivalent metal ion; a catalytic agent comprising a fatty quaternized amine, and a base. In one embodiment, the base may comprise a primary amino alcohol such as monoethanolamine.

BRIEF DESCRIPTION OF THE DRAWINGS

Embodiments and examples of the present invention are described herein with reference to the following drawings. Gels were prepared in diesel oil unless otherwise stated.

FIG. 1 shows the effect of pH on the thermal rheological profile of an iron system.

FIG. 2 shows the effect of pH on the thermal rheological profile of an aluminum system.

FIG. 3 shows the thermal rheological profile of an oil gel containing MB2HTAC.

FIG. 4 shows the thermal rheological profile of an oil gel containing BTAC.

FIG. 5 shows the thermal rheological profile of an oil gel containing 2M2HTAC.

FIG. 6 shows the thermal rheological profile of an oil gel containing 2MBHTAC.

FIG. 7 shows the thermal rheological profile of an oil gel containing CTAC.

FIG. 8 shows the thermal rheological profile of an oil gel containing OTAC.

FIG. 9 shows the thermal rheological profile of an oil gel containing 2MBAAC.

FIG. 10 shows the thermal rheological profile of the control (contains no quaternised amine species).

FIG. 11 shows the rheological profile of an oil gel prepared with 6 L/m$^3$ LO11ALA and various loadings of Beta crosslinker.

FIG. 12 shows the effect of MEA loading on the rheology of an oil gel containing 6.0 Lm-3 LOLA and 6.0 Lm-3 Beta crosslinker FIG. 13 shows the stability of oil gels containing 0.5 L/m$^3$ MEA and varying Beta crosslinker loading FIG. 14 shows the effect of varying catalytic agent loading as a percentage of Beta 2 DMB content on the rheology of an oil gel FIG. 15 shows a comparison of thermal rheological profiles of Beta, Beta 2 and Beta 3 in C2000

DETAILED DESCRIPTION OF PREFERRED EMBODIMENTS

The present invention relates to improvements in hydrocarbon gels used as a fracturing fluid. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

A fracturing fluid of the present invention comprises a hydrocarbon fluid, a gelling agent, and a crosslinking composition. The crosslinking composition comprises a crosslinking agent and a catalytic agent. In one embodiment, the crosslinking composition and the gelling agent are added separately to the hydrocarbon fluid "on the fly". However, the order of mixing is not material and the crosslinking composition and the gelling agent may be combined with the hydrocarbon fluid, either in batches, or in a continuous process. In one embodiment, the crosslinking agent and the catalytic agent may be separately added to the hydrocarbon fluid, before or after the gelling agent is added to the mixture.

The fracturing fluids described herein may be used in any fracturing or well servicing operation where a viscous hydrocarbon gel is used. Such operations are well known in the art, and need not be described further herein.

The hydrocarbon gels use a base fluid hydrocarbon, which is well known in the art. For example, commercially available base fluids include SF-840 SF-830, SF-770, TG-740 (all trademarks) from SynOil Fluids Canada, TSO-9001, TSO-9004, Ricinus Gold (all trademarks) from Terroco Industries Ltd, Harmatten Premium, C2000, BC-98, RX2100 (all trademarks) from DC Energy Services Inc. Common hydrocarbons such as diesel oil and crude oil are also suitable.

The choice of hydrocarbon may be made having regard to the accessibility and economics of a particular application. In one embodiment, diesel oil is the base fluid hydrocarbon.

The gelling agent may comprise any phosphate ester which causes the hydrocarbon to gel, and includes, for example, orthophosphate esters such as mixed ethyl, octyl and decyl diesters. Typical gelling agents may include mixtures of mono-, di- and triesters, with a predominant amount of diesters, for example, about 75% diesters. Exemplary examples of suitable phosphate ester gelling agents include, without limitation, variants of the phosphate-esters EG2 and Ethox 4070 from Ethox Chemicals, LLC, WEC HGA 37, WEC HGA 70, WEC HGA 71, WEC HGA 72, WEC HGA 702 (all trademarks) or mixtures or combinations thereof using tri-alkyl-phosphates in place of tri-ethyl-phosphate, available from Weatherford International, iso-octyl, 2-ethyl-hexyl, phosphate esters or other phosphate esters from P-2. Other suitable gelling agents include, without limitation, Gel-tone II™ available from Baroid, Ken-Gel™ available from Imco or the like. An exemplary gelling agent is available commercially as Rhodafac™ LO-11A-LA (CAS No. 68412-60-2). Gelling agents suitable for the present invention react with multivalent metal salt crosslinking agents to form high viscosity gels.

The gelling agent forms an inorganic coordination polymer in the hydrocarbon base fluid which creates the viscosity of the gel. Typically, the gelling agent will be added to the hydrocarbon in the field in concentrations of between about 2 L/m³ to about 10 L/m³ by volume, however, these concentrations are not limiting of the present invention. A person skilled in the art may vary the concentration to achieve desired viscosities in particular applications.

The crosslinking agent may comprise an aluminum salt, or a ferric salt. In one embodiment, the crosslinking agent comprises a ferric salt, such as ferric citrate, ferric sulphate or ferric chloride. One skilled in the art may determine suitable concentrations of the crosslinking agent for hydrocarbon gellation empirically using the methods described herein. In general, the crosslinking agent may be provided in a molar ratio of about 1:3 to about 3:1 crosslinking agent:gelling agent, depending on the identity of the crosslinking agent and the gelling agent and other process variables. In one embodiment, the molar ratio may be between about 1:2 to about 2:1.

In one embodiment, the fluid comprises an amount of an acid or a base to adjust the pH of the aqueous phase. Generally, more alkaline pH values provide a beneficial effect on rheology and temperature stability, up to a threshold level beyond which performance degrades. A weak base such as an amine may be used for this purpose. The amine may be a primary, secondary or tertiary amine. In one embodiment, the amine is a primary amino alcohol, such as monoethanolamine (MEA).

MEA dissolves in ferric salt solutions, neither forming a precipitate nor producing excessive temperature increase. While MEA is a weaker base than caustic soda, at the pH values anticipated in the aqueous phase (pH 0 to 2), it appears to function in an equivalent manner. In one embodiment, a primary amine such as MEA may be added up to the point at which the metal ion begins to precipitate.

Without restriction to a theory, the addition of a base appears to increase the concentration of non-acidic phosphate diester available to coordinate to the metal ions present. One result is that the gel exhibits better temperature stability with a base such as NaOH or MEA present.

In this invention, the crosslinking composition comprises a catalytic agent which increases the rate at which gel formation occurs, which catalytic agent comprises a fatty quaternized amine having the general formula:

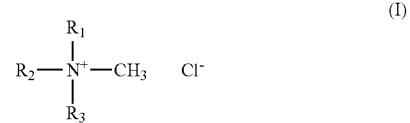

Where $R_1$ is long chain alkyl (C8+); $R_2$ is long chain alkyl (C8+), benzyl or methyl; and $R_3$ is benzyl or methyl. In preferred embodiments, the long chain alkyl is C12 or greater.

In specific embodiments, the catalytic agent may comprise one or a mixture of the following:
CTAC—cetyl trimethyl ammonium chloride
BTAC—behenyl trimethyl ammonium chloride
OTAC—octadecyl trimethyl ammonium chloride
2MBAAC—dimethyl benzyl alkyl ammonium chloride
2MBHTAC—dimethyl benzyl hydrogenated tallow ammonium chloride
2HT2MA—dihydrogenated tallow dimethyl ammonium chloride
MB2HTAC—methyl benzyl dihydrogenated tallow ammonium chloride In a preferred embodiment, the fatty quaternized amine comprises a monoalkyl benzyl quaternary amine where, with reference to the general formula I above, R1 is a long chain alkyl, at least one of R2 and R3 is benzyl, and R2 or R3 which is not benzyl is methyl. Exemplary monoalkyl benzyl quaternary amines include the dimethyl derivatives 2MBAAC or 2MBHTAC. 2MBAAC has the formula:

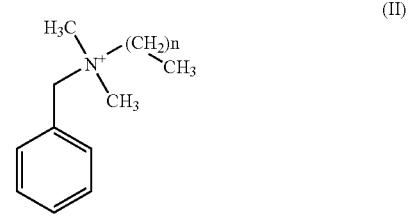

where $n \geq 11$.

2MBHTAC has the formula:

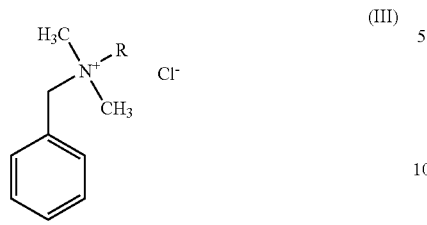

where R is hydrogenated tallow (C8-C20 alkyl groups).

An exemplary material of 2MBAAC is commercially available as Alkaquat™ DMB-451 (Rhodia Canada Inc., Missisauga, ON), which is a cationic surfactant also known as dimethyl benzyl alkyl ammonium chloride. With reference to formula II, this material is a mixture of n=11, 13 and 15.

The amount of catalytic agent may vary in accordance with the amount of gelling agent used. Effective results may be obtained where the catalytic agent to gelling agent ratio in the final mixture of fracturing fluid is about 1:18 to about 1:3 by volume. In one embodiment, the ratio is about 1:6.

In one embodiment, a coupling agent may be used if the catalytic agent and the metal salt solution do not readily mix. The coupling agent facilitates mixing of the two materials. In one embodiment, a glycol, such as ethylene glycol is a suitable coupling agent. In a preferred embodiment, an alkaline material which also facilitates mixing of the two materials may serve both roles of adjusting pH and facilitating mixing of the catalytic agent and the metal salt solution. Suitable bases which also facilitate mixing include amino alcohols such as MEA.

Therefore, embodiments of the crosslinking compositions of the present invention may comprise about 60% to about 90% of a ferric salt solution, about 5% to about 15% catalytic agent, about 0% to about 12% of a base, and about 0% to about 16% of a coupling agent (all by weight percent). In preferred embodiments, there are sufficient ferric ions to stoichiometrically complex with the amount of gelling agent used and sufficient catalytic agent to appreciably accelerate the rate of gel formation. The range of useful and optimal amounts of each material may be empirically determined using the methods described in the examples below.

Four specific embodiments of a crosslinking composition are illustrated in the Table A below:

TABLE A

|  | Ferric Sulphate 50% | Alkaquat DMB-451 80% | MEA | Ethylene Glycol |
|---|---|---|---|---|
| Beta | 70.5 | 13.9 | None | 15.6 |
| Beta 1 | 76.0% | 11.7% | 4.0% | 8.3% |
| Beta 2 | 86.2% | 9.3% | 4.5% | None |
| Beta 3 | 78.1% | 12.0% | 9.9% | None |

All percentages are weight percent.

EXAMPLES

Example 1

Effects of pH on Gel Stability

Standard hydrocarbon gelling systems were prepared and varying quantities of acid or base were added. The aluminum system was prepared by using 3.12 mmol of aluminum chlorohydrate as a 50% aqueous solution with 1.8 mL of Rhodafac™ LO-11A-LA in 300 mL diesel. Iron gels were prepared by using 6.75 mmol of ferric sulphate as a 50% aqueous solution with 1.8 mL of Rhodafac™ LO-11A-LA in 300 mL diesel. FIG. 1 displays the thermal rheological profile of an iron system. FIG. 2 displays the thermal rheological profile of the aluminum system. Additives and concentrations are noted in the legend, NaOH refers to 50% NaOH, $H_2SO_4$ refers to concentrated sulphuric acid and HCl refers to 20% HCl.

It is apparent in both systems that the addition of acid had a negative impact on both the rheology and the temperature stability whereas, the addition of base had a beneficial effect on the rheology. The iron system was found to be more tolerant to the addition of acids or bases.

Example 2

Quaternized Amines

Gels were prepared using diesel and the following additives:

Rhodafac™ LO-11A-LA ("LOLA"); 6 L/m$^3$

50% NaOH; 0.33 L/m$^3$

50% Ferric Sulphate (aqueous): 4, 5.33 and 6.67 L/m$^3$ (three concentrations for each quaternized amine)

Quaternized Amine-weight equivalent (on the basis of activity) of 0.5 L/m$^3$ of Alkaquat DMB-451 80%

The gels were prepared on a Hamilton Beach milkshake mixing apparatus. The mixer was connected to a rheostat set at 50V, with the mixer itself set at high speed. 300 mL of diesel was used for the base fluid. Rhodafac™ LO-11A-LA, NaOH and the catalytic agent were added sequentially. The desired iron loading was then added and the time for the vortex to close about the mixing impeller was recorded as the "crosslink time". The gels were sheared for a further 1 to 2 minutes to fully develop the gel.

After preparation of the gels, rheology versus temperature profiles were established on a Brookfield PVS Viscometer using the B5 geometry. The viscosity versus temperature profile was obtained for each material by ramping the temperature to various plateaus and measuring the viscosity at each plateau for approximately 60 minutes.

The mol ratios of phosphate ester:Fe(III) tested were approximately 4:3, 1:1 and 4:5.

Crosslink times for each of the quaternized amines listed above are summarized in Table 1.

TABLE 1

Crosslink Times for Quaternized amines at Various Iron Loadings

| Product | Crosslink Time (seconds) | | |
|---|---|---|---|
| | 4 L/m³ Fe$_2$(SO$_4$)$_3$ | 5.33 L/m³ Fe$_2$(SO$_4$)$_3$ | 6.67 L/m³ Fe$_2$(SO$_4$)$_3$ |
| CTAC | 90 | 60 | 57 |
| OTAC | 60 | 34 | 30 |
| BTAC | 32 | 32 | 27 |
| 2MBAAC | 13 | 7 | 7 |
| 2MBHTAC | 20 | 17 | 8 |
| 2HT2MAC | 50 | 86 | 62 |
| MB2HTAC | 80 | 75 | 50 |
| Control (No quaternized amine) | >600 | >600 | >600 |

Example 3

Temperature Viscosity Profiles

Temperature viscosity profiles for the quaternized amines shown in Table 1 and the control sample are summarized in FIGS. 3 through 10. The samples were prepared as outlined in example 2. All of the samples, including the control sample showed increasing viscosity with increasing temperature up to a certain point. Most of the samples tested had an increasing viscosity profile with respect to temperature up to about 70° C. When the temperature was increased to 90° C., viscosity reduction was noted in most of the samples. The samples that did not display this behaviour had viscosity reductions at lower temperatures.

Example 4

Loading of Crosslinking Agent on Crosslink Times and Temperature Stability

The effect of the loading of crosslinking agent on temperature stability and crosslink times was tested on diesel treated with 6 L/m³ of Rhodafac™ LO-11A-LA (LOLA) and Beta crosslinking composition (described in Table A above). Table 2 below summarizes the crosslink times that were observed in this system.

TABLE 2

Crosslink Times of Diesel with LOLA and Beta Crosslinker
Crosslink Time (seconds)

| 4 L/m³ Beta | 6 L/m³ Beta | 8 L/m³ Beta | 10 L/m³ Beta |
|---|---|---|---|
| 35 | 14 | 9 | 6 |

Increasing loads of Beta result in decreasing crosslinking times. Qualitative observations of the gels indicated that the higher the loading of Beta, the more shear sensitive the gel became, however no gel appeared to be too fragile to be used as a fracturing fluid. The viscosity temperature profile for each of the fluids is plotted in FIG. 11. The higher the crosslinker loading, the more thermally stable the resultant gel, which correlates well with previous tests performed with iron crosslinkers.

Example 5

Effect of MEA Loading on a Beta Crosslinker System

MEA was added to diesel at various concentrations and then Beta and LOLA were added to the diesel, each at 6 L/m³. Crosslink times are summarized in Table 3.

TABLE 3

Crosslink Times of Diesel with LOLA and Beta Crosslinker and Varying MEA Concentrations
Crosslink Time (seconds)

| No MEA | 0.25 L/m³ MEA | 0.50 L/m³ MEA | 0.75 L/m³ MEA |
|---|---|---|---|
| 14 | 10 | 14 | 15 |

The presence of MEA had little effect on the rate at which the fluid crosslinked in the loading range tested. The fluids were heated to 100° C. in the Brookfield PVS. The rheology profile of each is summarized in FIG. 12. The presence of MEA had two noticeable effects. First, the initial viscosity of the sample was found to increase with increasing MEA concentration. Second, the presence of MEA provided improved temperature stability.

Example 6

Effect of MEA at Varying Beta Loadings

In this test, the concentration of MEA was held constant at 0.5 L/m³, the concentration of LOLA was held constant at 6 L/m³ and the concentration of Beta was varied. The crosslink time in diesel for the gels is summarized in Table 4.

TABLE 4

Crosslink Times of Diesel with LOLA and Beta Crosslinker with 0.5 L/m³ MEA
Crosslink Time (seconds)

| 4 L/m³ Beta | 6 L/m³ Beta | 8 L/m³ Beta | 10 L/m³ Beta |
|---|---|---|---|
| 35 | 14 | 6 | 4 |

Increasing Beta concentrations result in a decrease in crosslink time. No noticeable effect on crosslink time was observed when the results are compared the equivalent systems without MEA, summarized in Table 2. The crosslink times are identical at 4 and 6 L/m³ loadings and slightly faster for the MEA containing samples at the 8 and 10 L/m³ loadings. The initial viscosity of all the gels except the 4 L/m³ loading were higher than the equivalent systems without MEA, and the final viscosity at temperature was higher for all of the systems. Viscosity comparisons are summarized in Table 5, the viscosity profiles are presented in FIG. 13.

TABLE 5

Viscosity Comparison of MEA Treated Systems
Viscosity of Beta Systems Treated With MEA as a Percentage of
the Equivalent Untreated System

| 4 L/m³ Beta | | 6 L/m³ Beta | | 8 L/m³ Beta | | 10 L/m³ Beta | |
|---|---|---|---|---|---|---|---|
| Initial | Final | Initial | Final | Initial | Final | Intial | Final |
| 80% | 1500% | 130% | 220% | 140% | 150% | 160% | 170% |

Example 7

Alkaquat DMB-451 80% Optimization

Formulations were prepared by varying the concentration of DMB in a crosslinker formulation comprising 4 parts (76.0 wgt %) ferric sulphate (50%), 1 part (11.7 wgt %) Alkaquat DMB-451 80%, $\frac{1}{3}^{rd}$ part (4.0 wgt %) MEA and $\frac{2}{3}^{rds}$ part (8.3 wgt %) ethylene glycol (Beta 1). For the purpose of this test, "100% concentration" corresponds to 1 part DMB in 6 parts total crosslinking composition by volume.

TABLE 6

Crosslink Times of Diesel with Varying DMB Content
DMB Content (100% = 1 part in 6)

| 36% | 74.5% | 100% | 160% |
|---|---|---|---|
| 40 seconds | 11 seconds | 10 seconds | 10 seconds |

Beyond 74.5% of the available DMB in Beta 2, no reduction in crosslink time was observed. The exact concentration at which the minimum crosslink occurs was not determined, however it was somewhere between 1 part in 18 and 1 part in 8. The rheological profile of these fluids as a function of time and temperature is shown in FIG. 14. The profiles are all quite similar except at the lowest concentration which showed superior rheological properties but had a relatively long crosslink time.

Example 8

Comparison of Beta 1, Beta 2 and Beta 3 and a Prior Art Crosslinker

Beta 1, Beta 2 and Beta 3 formulations were prepared and compared with each other and a prior art crosslinking composition which we believe does not contain a fatty quaternized amine. Beta 3 refers to a formulation which does not include ethylene glycol, consisting of ferric sulphate 50%-78.1%, MEA-9.9%, and Alkaquat DMB-451 80%-12.0% (all wt. %). These formulations (the loading of the crosslinker solutions was 4.8 Lm-3) were added to C2000 and LOLA at 6 L/m³ and mixed as described above.

The results are shown in FIG. 15. Both Beta 1 and Beta 2 showed higher viscosity than Beta 3 and the prior art crosslinker below about 70° C. or less, but viscosity dropped sharply at about 80° C. Beta 3 showed lower viscosity than Beta 1 and Beta 2 between about 30° C. and about 70° C., showed significantly higher viscosity above 70° C. than either Beta 1 and Beta 2. Beta 3 demonstrates higher viscosity than the prior art crosslinker below about 70° C., and comparable viscosity above 70° C.

What is claimed is:

1. A composition for gelling a hydrocarbon fracturing fluid, comprising:
   (a) a gelling agent comprising a phosphate ester;
   (b) a crosslinking agent comprising a multivalent metal ion; and
   (c) a catalytic agent comprising a fatty quaternized amine;
   wherein said composition gels as a result of coordination complexes formed in the fluid.

2. The composition of claim 1 further comprising a base.

3. The composition of claim 2 wherein the base comprises NaOH or a primary amino alcohol.

4. The composition of claim 3 wherein the primary amino alcohol comprises monoethanolamine.

5. The composition of claim 1 further comprising a coupling agent.

6. The composition of claim 5 wherein the coupling agent comprises ethylene glycol or a primary amino alcohol.

7. The composition of claim 6 wherein the primary amino alcohol comprises monoethanolamine.

8. The composition of claim 1 wherein the crosslinking agent comprises ferric ions.

9. The composition of claim 8 wherein the crosslinking agent comprises ferric sulphate.

10. The composition of claim 1 wherein the fatty quaternized amine comprises a monoalkyl benzyl quaternized amine.

11. The composition of claim 10 wherein the fatty quaternized amine comprises dimethyl benzyl alkyl ammonium chloride or dimethyl benzyl hydrogenated tallow ammonium chloride.

12. A method of forming a gelled hydrocarbon fracturing fluid, comprising the step of mixing together a base hydrocarbon fluid; a gelling agent comprising a phosphate ester; a crosslinking agent comprising a multivalent metal ion; and a catalytic agent comprising a fatty quaternized amine.

13. The method of claim 12 wherein the fatty quaternized amine comprises a monoalkyl benzyl quaternized amine.

14. The method of claim 13 wherein the fatty quaternized amine comprises dimethyl benzyl alkyl ammonium chloride or dimethyl benzyl hydrogenated tallow ammonium chloride.

15. The method of claim 12 wherein the hydrocarbon fracturing fluid mixture further comprises a base.

16. The method of claim 15 wherein the base comprises a primary amino alcohol.

17. The method of claim 16 wherein the primary amino alcohol comprises monoethanoloamine.

18. A method of improving the temperature stability of a gelled hydrocarbon fracturing fluid, comprising the step of mixing together a base hydrocarbon fluid; a gelling agent comprising a phosphate ester; a crosslinking agent comprising a multivalent metal ion; a catalytic agent comprising a fatty quaternized amine; and a base.

19. The method of claim 18 wherein the base comprises a primary amino alcohol.

20. The method of claim 19 wherein the primary amino alcohol comprises monoethanoloamine.

* * * * *